US012783996B2

(12) United States Patent
Li et al.

(10) Patent No.: US 12,783,996 B2
(45) Date of Patent: Nov. 3, 2026

(54) USING DIFFERENT TRAINED MODELS TO SELECT SUGGESTED FULFILLMENT SOURCES FOR DIFFERENT SLOTS OF A USER INTERFACE OF AN ONLINE SYSTEM

(71) Applicant: Maplebear Inc., San Francisco, CA (US)

(72) Inventors: Ying Li, San Francisco, CA (US); Stephanie Ho, San Francisco, CA (US); Rajeshkumar Swaminathan, San Francisco, CA (US); Brian Dang, Seattle, WA (US); Jonathan Gu, San Francisco, CA (US); Elizabeth Reichert, Creve Coeur, MO (US); Shishir Kumar Prasad, Fremont, CA (US); Jiachuan He, San Francisco, CA (US); Matias Cersosimo, Stanford, CA (US)

(73) Assignee: Maplebear Inc., San Francisco, CA (US)

( * ) Notice: Subject to any disclaimer, the term of this patent is extended or adjusted under 35 U.S.C. 154(b) by 182 days.

(21) Appl. No.: 18/753,903

(22) Filed: Jun. 25, 2024

(65) Prior Publication Data

US 2025/0390837 A1 Dec. 25, 2025

(51) Int. Cl.
*G06Q 10/087* (2023.01)
*G06Q 30/0601* (2023.01)

(52) U.S. Cl.
CPC .................................. *G06Q 10/087* (2013.01)

(58) Field of Classification Search
CPC .................................................... G06Q 10/087
See application file for complete search history.

(56) References Cited

U.S. PATENT DOCUMENTS

| | | | | |
|---|---|---|---|---|
| 11,126,785 | B1 * | 9/2021 | Nassif | G06Q 30/0244 |
| 12,373,879 | B2 * | 7/2025 | Maharaj | G06Q 30/0631 |
| 2013/0246176 | A1 | 9/2013 | Chang et al. | |
| 2019/0347704 | A1 | 11/2019 | Stamboni et al. | |
| 2022/0327597 | A1 | 10/2022 | Griesmer et al. | |
| 2023/0186360 | A1 * | 6/2023 | Loi | G06Q 30/0601 705/26.41 |
| 2024/0412271 | A1 * | 12/2024 | Xiao | G06Q 30/0631 |
| 2025/0166054 | A1 * | 5/2025 | Wang | G06Q 10/087 |

OTHER PUBLICATIONS

Patent Cooperation Treaty, International Search Report and Written Opinion, PCT Patent Application No. PCT/US2025/024147, dated Jun. 3, 2025, 10 pages.

* cited by examiner

*Primary Examiner* — Garcia Ade
(74) *Attorney, Agent, or Firm* — Fenwick & West LLP

(57) ABSTRACT

An online system displays an interface to users including slots in which sources from a list of sources of items (e.g., physical items, content items) are presented. The user may select a source via the interface to view items provided by, or associated with, the source. To simplify a user identifying a desired source, the online system includes sources that a user is likely to select as well as new sources in the list. To balance the competing interests of relevance of sources with which the user previously interacted and discovery of new sources, the online system selects an allocation of slots for new sources and for sources with prior interaction based on interactions by users in the geographic regions with different allocations of slots. Based on the selected allocation of slots, the online system selects specific retailers for each slot using ranking models corresponding to different slots.

17 Claims, 6 Drawing Sheets

USING DIFFERENT TRAINED MODELS TO SELECT SUGGESTED FULFILLMENT SOURCES FOR DIFFERENT SLOTS OF A USER INTERFACE OF AN ONLINE SYSTEM

BACKGROUND

Various online systems obtain items from various sources for users. For example, an online system is an online concierge system that receives orders for items from retailers from customers and allocates the orders to pickers. A picker to whom an order was allocated obtains items included in the order from a retailer identified by the order to fulfill the order. Subsequently, the picker delivers the obtained items to a location specified in the order by the customer. As another example, an online system provides content from various sources to a user and retrieves items comprising content for presentation from a source identified by a user.

Different sources provide different items to an online system for an order. For example, different retailers often provide different items to be obtained for a customer, allowing a user of an online concierge system to obtain different orders from different retailers. As another example, different sources provide items relating to different content to an online system allowing a user of the online system to obtain different types of content from different sources. Obtaining items from various sources allows an online system to provide a diverse range of items to a user.

To encourage users to obtain items from multiple sources, many online systems present a list of sources to a user through one or more interfaces. For example, an interface presented when a user initially accesses an online system presents a list of sources from which the online system may obtain items. A user may select a source from the list to access a list of items offered by the selected source, simplifying user identification of a source for one or more items. Additionally, presenting the list of sources allows an online system to identify sources to a user from which the user has not previously obtained items, simplifying retrieval of items from sources with which the user has not previously interacted.

Because many users access online systems using client devices with limited display areas, online systems often limit a number of sources included in a list presented to users to optimize available display area. With a limited number of sources displayed, conventional online systems leverage prior interactions with sources by a user to select sources included in the list. While this approach increases a likelihood of the customer selecting a source from the list because of the user's prior interaction with sources in the list, relying on prior interaction with sources by a user to generate a list of sources limits an ability of an online system to identify new sources to the user. This limited exposure to new sources decreases a likelihood of users subsequently obtaining items from a broader range of sources through an online system.

SUMMARY

In accordance with one or more aspects of the disclosure, an online system obtains items from different sources for presentation or access by various users. For example, the online system is an online concierge system with different sources comprising different retailers. A user of the online concierge system selects a retailer and identifies one or more items for a picker to obtain from the retailer. As another example, the online system is a content presentation system obtaining items comprising content for presentation to users from a source in response to receiving a selection of the source from a user.

To simplify selection of a source by users, one or more interfaces generated by the online system and presented to a user include a source identification section having a specific number of slots. Each slot identifies a source to the user. For example, each slot includes information identifying a different source (e.g., a name of a source, an image of a source, etc.). In response to receiving a selection of a slot, the online system retrieves at least a set of items associated with the source identified by the selected slot for presentation to the user, simplifying access to items offered by sources through user selection of a slot in the source identification section.

As the online system obtains items from multiple sources, the user may be unaware of sources from which the online system obtains items that have items potentially relevant to the user. To increase the user's awareness of different sources for items, the online system identifies one or more new sources using one or more slots of the source identification section. A "new source" is a source from which the user has not previously obtained items or from which the user has not obtained items during a specific time interval before presentation of the source identification section. However, to encourage interaction by the user, other slots in the source identification system identify sources with which the user has previously obtained one or more items or has previously performed one or more other specific interactions.

As the source identification section includes a specific and limited number of slots, to balance likelihood of user interaction with the source identification section and identification of new sources of items to the user, the online system uses certain slots in the source identification section to identify new sources and other slots in the source identification section to identify sources with which the user previously interacted. To optimize allocation of the specific number of slots in the source identification section between new sources and sources with which the user previously interacted, the online system accounts for variations in user interaction patterns in different geographic regions and sources accessible in different geographic regions by identifying a geographic region that includes multiple locations. The online system may individually identify different geographic regions in some embodiments, or may identify a geographic region satisfying one or more criteria in various embodiments.

For the identified geographic region, the online system identifies sources associated with the identified geographic region. For example, the online system identifies sources that offer items accessible to users of the online system within the identified geographic area. As an example, each source is a retailer offering items to be obtained for a user, so the online system identifies retailers having at least one physical location within the identified geographic region or having at least one physical location within a threshold distance of the identified geographic region. In another example, each identified source offers items comprising content for presentation to users that are accessible to users within the identified geographic region.

The online system uses different models to select sources for presentation in various slots of the source identification section of an interface. In various embodiments, the online system uses at least two models for selecting sources presented in different slots. Different models are used to select sources for presentation in different slots. For example, one model for selecting sources is an interaction model that outputs a probability of a user accessing one or more items available from a source, and the online system selects one or more sources with which the user previously interacted based on their corresponding probabilities. Using the interaction model allows the online system to include sources with which a user previously interacted in the source identification section, which increases a likelihood of the user selecting a source via the source identification section.

However, to select a new source for one or more slots in the source identification section, the online system applies a discovery model to attributes of sources and attributes of the identified geographic area to various sources with which the user has not previously interacted (or with which the user has not interacted in at least a threshold time interval). The discovery model generates an interaction volume for a new source (e.g., a number of interactions from users in the identified geographic region where users in the identified geographic region obtained items from a new source during a specific time interval) in various embodiments. The online system selects one or more new sources for one or more slots based on their corresponding interaction volumes. While presenting new sources in slots of the source identification section identifies additional sources of items to the user, the user's unfamiliarity with the new sources may decrease a likelihood of the user selecting a source via the source identification section.

To balance a number of slots of the source identification section used to present new sources and a different number of slots of the source identification section used to present sources with which the user previously interacted, the online system generates a set of candidate combinations for the identified geographic region. A candidate combination associates a model from at least a plurality of models with each slot of the source identification section where a model is associated with one or more slots and at least one additional model is associated with alternative slots. Hence, at least one slot in a candidate combination is associated with a different model than other slots in the candidate combination. Further, different candidate combinations associate the model or the additional model with a different slot than other candidate combinations, so the set of candidate combinations includes different associations of models of a plurality of models with different slots in the source identification section.

While the set of candidate combinations identifies different permutations of models for selecting sources identified by different slots, source identification sections presenting sources based on different candidate combinations elicit different amounts of interaction from users. To account for varying user interaction, the online system generates candidate source identification sections for each of the candidate combinations. In some embodiments, the online system generates candidate source identification sections for a subset of the candidate combinations. A candidate source identification section for a candidate combination uses a model associated with a slot by the candidate combination to identify a source identified by the slot. For example, a candidate combination associates a model with a first slot, a second slot, and a fifth slot, but associates an additional model with a third slot and a fourth slot. The candidate source identification section for the candidate combination includes sources selected using the model in the first slot, the second slot, and the fifth slot, but includes sources selected using the additional model in the third slot and the fourth slot.

Over time, the online system presents different candidate source identification sections to users associated with the identified geographic region. For example, the online system randomly selects a candidate source identification section for presentation to a user associated with the identified geographic region in response to receiving a request for an interface including a source identification section from the user associated with the identified geographic region. Randomly selecting a candidate source identification section for a user presents different candidate source identification sections to users associated with the identified geographic area over time. The online system captures interactions by users associated with the identified geographic region over time, storing descriptive information identifying interactions by a user with a candidate source identification section and an identifier of the candidate source identification section presented to the user. For example, the online system stores an indication that a user performed a specific interaction with a source included in the candidate source identification section within a threshold amount of time of being presented with the candidate source identification section. Based on captured interactions by users associated with the identified geographic region with various candidate source identification sections, the online system generates at least a plurality of metrics for each combination of models for selecting sources and slots based on captured interactions by users associated with the identified geographic region with candidate source identification sections corresponding a combination of models for selecting sources and slots. Generating multiple metrics based on interactions with a candidate source identification section allows the online system to evaluate effectiveness of different candidate source identification sections in causing different types of interactions by users.

In various embodiments, the online system generates a metric and an alternative metric for each combination based on captured interactions by users associated with the geographic region with corresponding candidate source identification sections. For example, the metric for a combination is based on a percentage of sources presented by a candidate source identification section corresponding to the combination with which users in the identified geographic region performed a specific interaction within a threshold amount of time after the candidate source identification section was presented to users via an interface. Hence, the metric provides an indication of user interaction with sources presented in the candidate source identification section. An example alternative metric for a combination is based on the percentage of sources presented by a corresponding candidate source identification section with which the user had not performed the specific interaction (or had not performed an alternative interaction) during a specific time interval before the candidate source identification section was presented. Hence, the alternative metric provides a measure of efficacy of the candidate combination in presenting new sources of items to the user via a corresponding candidate source identification section.

Based on at least a plurality of the metrics, the online system selects a specific combination of models for selecting sources and slots for the identified geographic region. As In various embodiments, the specific combination of models for selecting sources and slots is a candidate combination corresponding to a candidate source identification section having at least a threshold value for the metric and at least an additional threshold value for the alternative metric. In other embodiments, the specific combination of models for selecting sources and slots is a candidate combination where the metric satisfies one or more criteria, and the alternative metric satisfies one or more alternative criteria. The online system stores an association between the specific combination of models for selecting sources and slots and the identified geographic region. In various embodiments, the online system selects a specific combination of models for each of multiple geographic regions based on captured interactions by users from different geographic regions, as further described above.

Subsequently, the online system receives a request for an interface including the source identification section from a user associated with the identified geographic region. For example, the online system receives a request from a client device of a user associated with a location within the identified geographic region for an interface having the source identification section. The online system retrieves the specific combination of models for selecting sources and slots associated with the identified geographic region and generates a model-specific ranking of sources associated with the identified geographic region for each model included in the specific combination. For example, the specific combination associated with the geographic region includes an interaction model associated with one or more slots and a discovery model associated with one or more alternative slots, so the online system generates an interaction-specific ranking of sources associated with the identified geographic region using the interaction model and generates a discovery-specific ranking of sources associated with the identified geographic region using the discovery model. The online system generates a model-specific ranking of sources corresponding to each model associated with at least one slot by the specific combination associated with the identified geographic region.

Based on the model-specific rankings, the online system generates the source identification section for the user associated with the identified geographic region. The source identification section includes a specific number of slots, with each slot presenting information identifying a source selected based on a model-specific ranking 630 of sources corresponding to the model associated with the slot by the specific combination associated with a slot. For example, the source identification section includes three slots, and the specific combination associated with the identified geographic region associates the interaction model with a first slot and a third slot, but associates the discovery model with the second slot. In the preceding example, the online system selects sources for the first slot and the third slot using an interaction ranking of sources based on the interaction model, but selects a source for the second slot using a discovery ranking based on the discovery model. In various embodiments, the online system uses weighted sampling to select a source from a model-specific ranking to provide variation in sources selected during different times the source identification section is generated. As the specific combination associated with the identified geographic region identifies different models of a plurality of models with various slots of the source identification section, the specific combination associated with the identified geographic region affects which information is used to select sources displayed in different slots of the source identification section generated for the user associated with the identified geographic region. This allows the online system to optimally allocate the limited specific number of slots in the source identification section between sources with which the user previously interacted and new sources to optimize both short-term interaction with sources via the source identification section and interactions with a greater diversity of sources by the user based on previously captured interactions by users associated with the identified geographic region.

DETAILED DESCRIPTION

Figure 1:
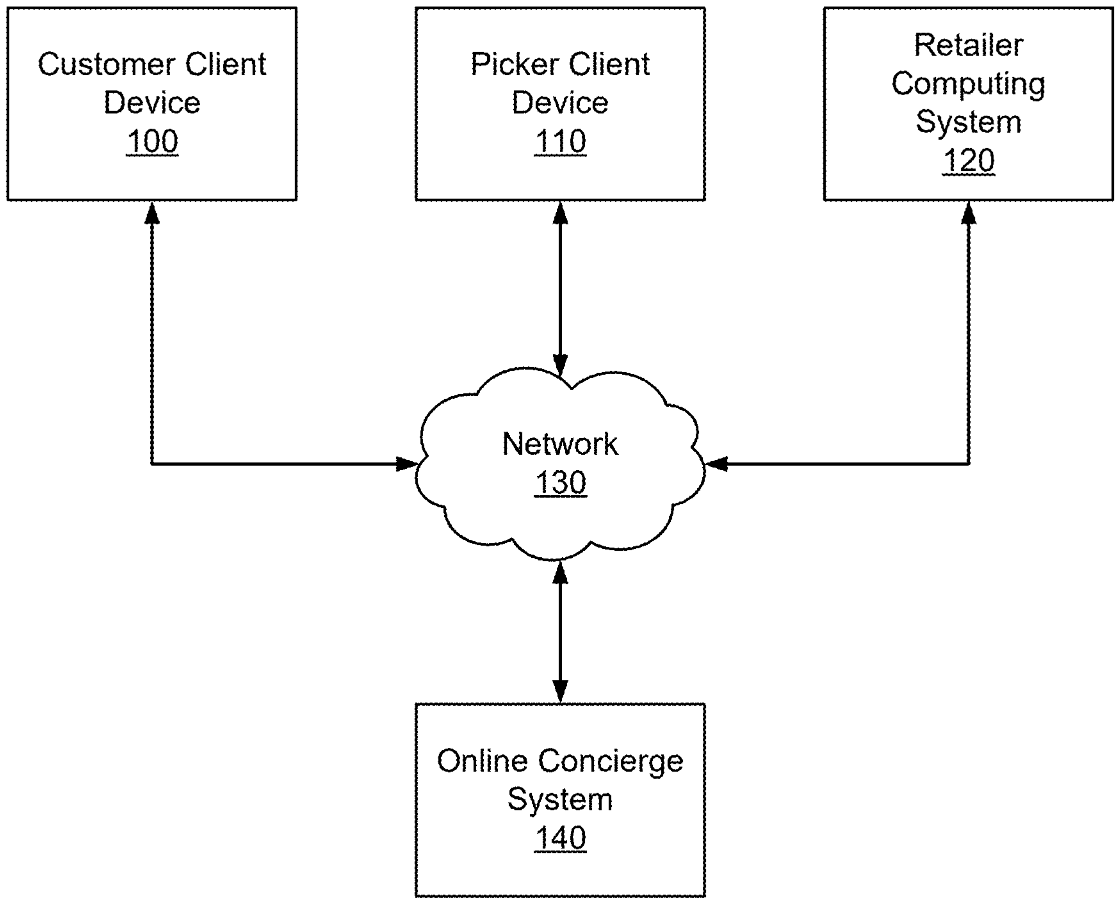
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120. As used herein, a "client device" may refer to a customer client device 100, a picker client device 110, a retailer computing system 120, or another type of device capable of accessing the online concierge system 140 through the network 130.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

As further described below in conjunction with FIGS. 3-6, one or more interfaces presented to a customer by the customer client device 100 include a source identification section. The source identification section includes a specific number of slots, with each slot identifying a different source of items to the customer. For example, each slot identifies a different retailer from which a customer may obtain items via an order. Including information identifying retailers in the source identification section simplifies creation of an order by the customer, allowing the customer to identify a retailer, or other source, for the order by selecting a slot identifying the source. As further described below in conjunction with FIGS. 3-6, the source identification section identifies one or more retailers from which the customer previously created an order as well as one or more new retailers from which the customer has not previously created an order, or has not previously created an order within a time interval of a time when the source identification section was presented. Different interfaces presented by the customer client device 100 may include the source identification section in various embodiments.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
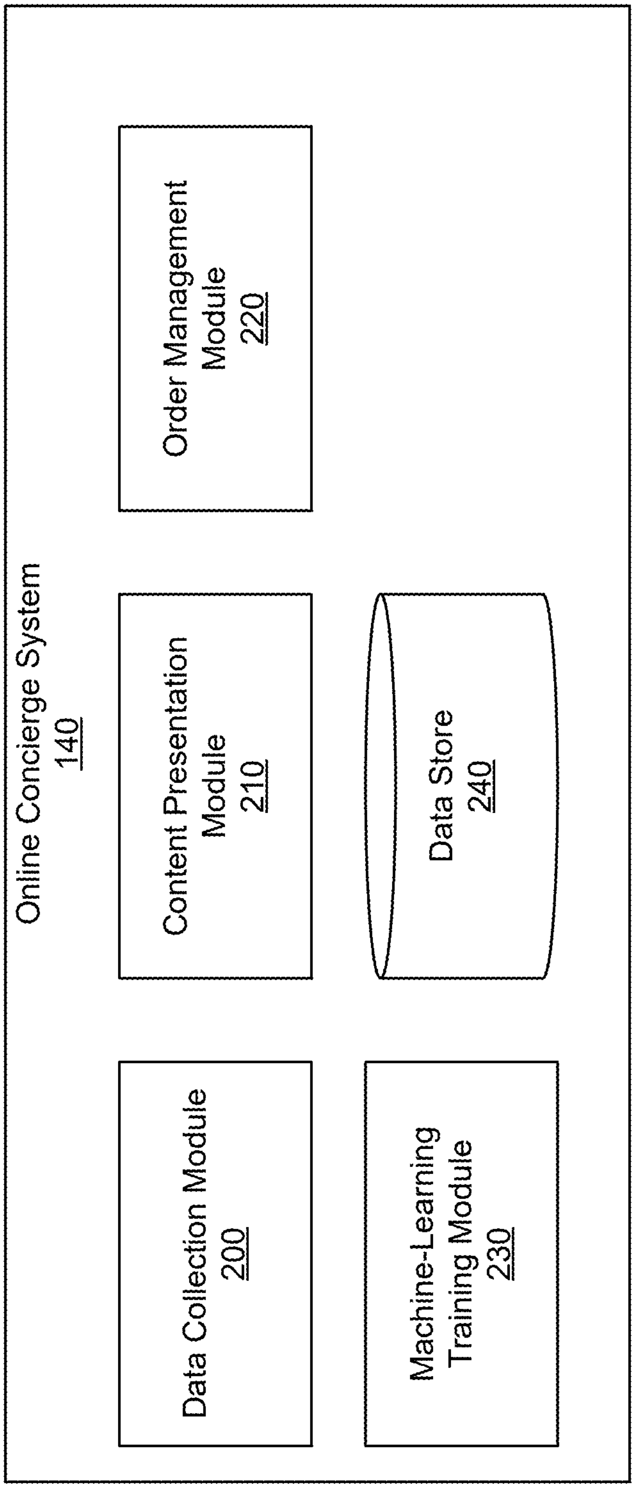
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The content presentation module 210 generates one or more interfaces for presentation to users that include a source identification section including a specific number of slots, with each slot identifying a different source of items to the customer. For example, each slot identifies a different retailer from which a customer may obtain items via an order. Other types of sources may be identified by slots in the source identification section, such as one or more sources from which items comprising content for presentation to a user are obtained for presentation. The content presentation module 210 uses at least a plurality of models to select sources for identification by different slots in the source identification section. For example, the content presentation module 210 uses a model to select sources for presentation by a set of slots and uses an alternative model to select sources for presentation in another set of slots. The model may select sources based on probabilities of the user performing a specific interaction with a source when presented by the source identification section, while the content presentation module 210 uses the additional model to select sources with which the customer has not previously performed a specific interaction ("new sources"). In other embodiments, the content presentation module 210 uses a greater number of different models to select sources for presentation by the source identification section, with different models selecting sources based on different types of information.

Figure 3:
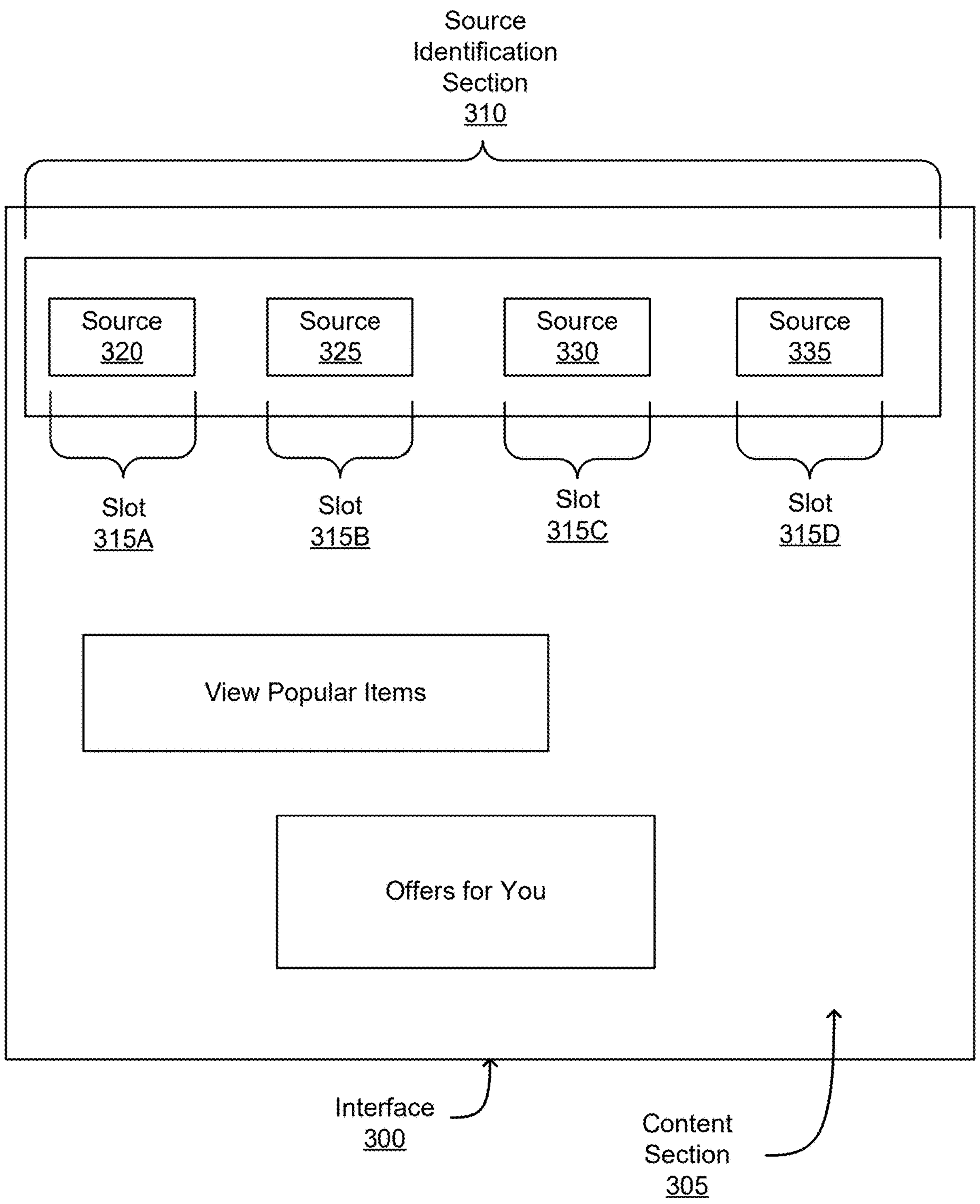
FIG. 3 illustrates an example interface including a source identification section identifying sources of items in different slots, in accordance with one or more embodiments.

FIG. 3 shows an example interface generated by the content presentation module 210 including a source identification section that simplifies retrieval of items from various sources. The source identification section includes a limited number of slots, with each slot identifying a source of items (e.g., a retailer). For purposes of illustration, FIG. 3 shows an example interface including a source identification section. In the example of FIG. 3, the interface 300 includes a content section 305 and the source identification section 310. The content section 305 comprises a portion of the interface 300 presenting content from the online concierge system 140 (or another online system) to a user. For example, the content section 305 presents information identifying items offered by one or more sources, such as items for which the online system received at least a threshold amount of user interaction, items recently offered by a source, or items having other characteristics. The content section 305 may present informational content about operation of the online system or messages to the user from the online system in various embodiments. Other types of content may additionally or alternatively be presented to users via the content section 305 of the interface 300.

As an online system, such as the online concierge system 140, obtains items from various sources (e.g., retailers), the source identification section 310 of the interface 300 includes multiple slots 315A-D (also referred to individually and collectively using reference number 315) that each identify a source. The source identification section 310 includes a specific number of slots 315, which limits a number of sources capable of being identified by the source identification section 310. In response to the user selecting a slot via the source identification section 310, the online system retrieves at least a set of items offered by the source identified by the selected slot. For example, each source is a retailer from which one or more items are obtained and delivered to a location specified by the user, so the user selecting a slot via the source identification section 310 presents at least a set of the items offered by the retailer identified by the selected slot to the user, allowing the user to create an order by selecting items offered by the retailer.

In the example of FIG. 3, the source identification section 310 includes four slots, slot 315A, slot 315B, slot 315C, and slot 315D. However, in other embodiments, the source identification section 310 may include any number of slots. Further, the example of FIG. 3 shows source 320 identified by slot 315A, source 325 identified by slot 315B, source 330 identified by slot 315C, and source 335 identified by slot 315D. For example, each slot 315 displays an image, a logo, a name, or other descriptive information of a source identified by the slot 315. In the example of FIG. 3, a user selecting slot 315C causes the online system from which the interface 300 was received to retrieve at least a set of items offered by source 330, which was identified by slot 315C, and to present the set of items to the user. This allows the user to select one or more items from source 330, and simplifies identification of source 330 to the online system through selection of slot 315C rather than the user providing multiple inputs to the online system to identify source 330.

In the source identification section 310, the online system displays a set of sources with which the user previously interacted (e.g., previously performed one or more specific interactions) in certain slots. For example, the content presentation module 210 displays retailers with which a user previously created orders in some slots 315 of the source identification section 310. By identifying sources with which the user previously interacted in one or more slots 315, the source identification section 310 identifies sources likely to be relevant to the user in the source identification section 310, which increases a likelihood of the user selecting one or more sources via the source identification section 310. For example, a user previously generated one or more orders for fulfillment from source 320, source 330, and source 335 in the example of FIG. 3, so identifying source 320, source 330, and source 335 in the source identification section 310 increases a likelihood of the user selecting one or more of slot 315A, slot 315C, or slot 315D.

However, the online system obtains items from a diverse group of sources, some of which the user viewing the source identification section 310 may be unaware are accessible via the online system. To identify new sources, which are sources with which the user has not previously performed a specific interaction or sources with which the user has not performed the specific interaction within a threshold time interval of a time when the source identification section is presented, the content presentation module 210 identifies one or more new sources via a different set of slots 315. Identifying one or more new sources in slots 315 of the source identification section 310 allows the identification of a broader range of sources to the user. Such exposure of new sources to the user increases a likelihood of the user interacting with one or more of the new sources, which increases overall interaction by the user with the online system (e.g., creates orders for fulfillment from one or more new retailers identified by the source identification section 310). In the example of FIG. 3, source 325 is a new source for the user, such as a source from which the user has not previously selected one or more items or a source from which the user has not selected one or more items within a threshold time interval before the interface 300 was presented.

Having a specific number of slots 315 in the source identification section 310 allows the interface to optimally allocate a limited display area of a display device between identifying sources and displaying other content. Because of the limited display area for the source identification section 310, the content presentation module 210 allocates different slots 315 in the source identification section 310 to new sources and to sources with which the user previously interacted. Such an allocation identifies both sources with which the user has not previously interacted and sources with which the user has previously interacted through the source identification section 310. Including sources with which the user previously interacted increases a likelihood of the user selecting a source from the source identification section 310, while limiting ability of identifying new sources to the user via the source identification section 310. However, including new sources of items in the source identification section 310 may increase long term interaction with the online system by providing the user with a broader range of sources of content. The limited specific number of slots 315 in the source description section 310 creates competing goals for the content presentation module 210 to display sources with which the user previously interacted, which reduces exposure to new sources of items via the source identification section 310, and to display new sources, which reduces a likelihood of the user selecting a source via the source identification section 310.

The content presentation module 210 uses different trained models for selecting a new source for presentation to the user via a slot 315 in the source identification section 310 and for selecting a source with which the user previously interacted for presentation to the user via the slot 315. For example, the online system applies a trained interaction model to sources with which the user previously interacted to select a source with which the user previously interacted for a slot 315. The interaction model generates a probability of the user accessing one or more items available from a source based on attributes of a source and characteristics of a user, including prior interactions with the source by the user. In various embodiments, the content presentation module 210 selects one or more sources with which the user previously interacted based on their corresponding probabilities. For example, the content presentation module 210 ranks sources with which the user previously interacted based on their generated probabilities and selects a source with which the user previously interacted having at least a threshold position in the ranking for a slot 315.

To select a new source for a slot, the content presentation module 210 applies a different trained discovery model to attributes of sources and attributes of a geographic area to various sources with which the user has not previously interacted (or has not interacted in at least a threshold time interval). The discovery model generates an interaction volume for a new source (e.g., a number of a specific interaction performed by users associated with a geographic with the new source received during a specific time interval) in various embodiments. The content presentation module 210 selects one or more new sources based on their corresponding interaction volumes for presentation in one or more corresponding slots 315. As the interaction model and the discovery model leverage different information about sources and the user for selecting sources, different sources are selected for a slot depending on which model the content selection model 210 uses for the slot.

Because the source identification section 310 includes a limited number of slots 315, the content presentation module 210 accounts for interactions by users with sources presented in the source identification section 310 over time to determine how to allocate slots 315 in the content presentation module 210 to selection of sources using different models. Accounting for user interaction allows the content presentation module 210 to present both sources with which a customer previously interacted and new sources to the customer to increase short-term and long-term interaction with the online concierge system 140 by the customer via the source identification section 310. As further described below in conjunction with FIGS. 4-6, the content presentation module 210 generates different candidate combinations that each associate a model from a plurality of models with one or more slots 315 and associate an additional model from the plurality of models with one or more alternative slots 315 and generates a candidate source identification section for each candidate combination. The content presentation module 210 presents interfaces including different candidate source identification sections to users associated with a geographic region and selects a specific combination for the geographic region based on multiple metrics generated based on interactions by users in the geographic region with different candidate source identification sections. Subsequently, when the content presentation module 210 receives a request for an interface including the source identification section from a user associated with the geographic region, the content presentation module 210 retrieves the specific combination associated with the geographic region and generates the source identification section based on the specific combination, as further described below in conjunction with FIGS. 5 and 6.

Referring back to FIG. 2, the order management module 220 manages orders for items from customers. The order management module 220 receives orders from a customer client device 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross-entropy loss function. The machine learning training module 230 updates the set of parameters for the machine learning model based on the score generated by the loss function. For example, the machine learning training module 230 may apply gradient descent to update the set of parameters.

In various embodiments, the machine learning training module 230 trains an interaction model that generates a probability of a user performing a specific interaction with a source (e.g., accessing an item available from the source, creating an order for fulfillment from a source, storing an item associated with an order) source based on attributes of the source and characteristics of a user, including prior interactions with the source by the user. The machine learning training module 230 generates an interaction training dataset that includes multiple interaction training examples. Each interaction training example includes characteristics of a training user and attributes of a training source, with a label applied to a training example indicating whether the training user performed the specific interaction with the training source. The machine learning training module 230 applies the interaction model to multiple interaction training examples. Application of the interaction module to an interaction training example generates a predicted probability of the training user performing the specific interaction with the training source. The machine learning training module 230 scores the interaction model based on a difference between the predicted probability and a label associated with an interaction training example to which the interaction model was applied. For example, the machine learning training module 230 applies a loss function to an interaction training example and predicted probability from application of the interaction model to the interaction training example to score the interaction model. The machine learning training module 230 updates one or more parameters of the interaction model based on the score through backpropagation until one or more criteria are satisfied.

Similarly, in some embodiments, the machine learning training module 230 trains a discovery model that generates an interaction volume with a source (e.g., a number of occurrences of a specific interaction with the source during a specified amount of time) based on attributes of the source and attributes of a geographic region associated with the source. The machine learning training module 230 generates a discovery training dataset that includes multiple discovery training examples. Each discovery training example includes attributes of a training geographic region and attributes of a training source, with a label applied to a training example indicating a number of occurrences of the specific interaction with the training source by users associated with the geographic location during the specified amount of time. The machine learning training module 230 applies the discovery model to multiple discovery training examples. Application of the discovery module to a discovery training example generates a predicted interaction volume by users associated with the training geographic region with the training source. The machine learning training module 230 scores the discovery model based on a difference between the predicted interaction volume and a label associated with a discovery training example to which the discovery model was applied. For example, the machine learning training module 230 applies a loss function to a discovery training example and predicted probability from application of the discovery model to the training example to score the discovery model. The machine learning training module 230 updates one or more parameters of the discovery model based on the score through backpropagation until one or more criteria are satisfied.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

Figure 4:
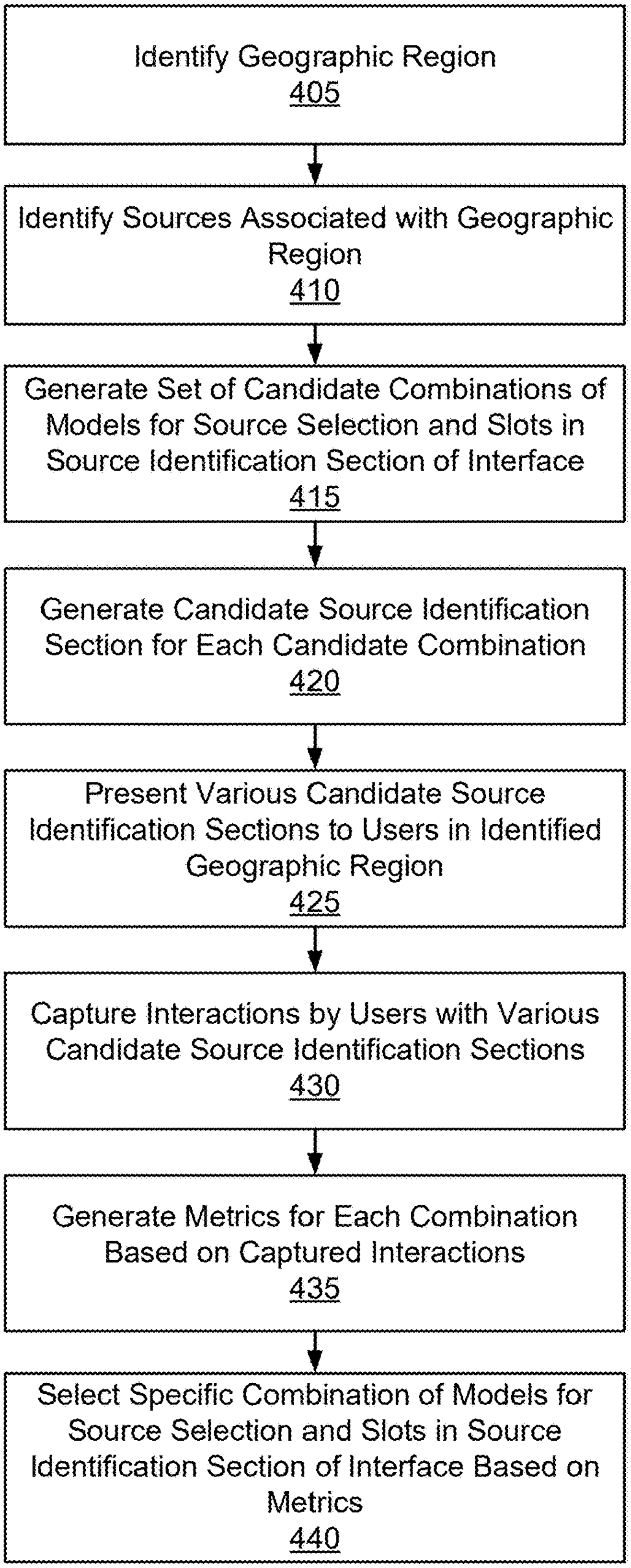
FIG. 4 illustrates a flowchart of a method for an online system selecting sources of content for presentation in different slots of an interface, in accordance with one or more embodiments.

FIG. 4 is a flowchart of a method for an online system selecting sources of content for presentation in different slots of an interface, in accordance with some embodiments. Alternative embodiments may include more, fewer, or different steps from those illustrated in FIG. 4, and the steps may be performed in a different order from that illustrated in FIG. 4. These steps may be performed by an online concierge system (e.g., online concierge system 140). Additionally, each of these steps may be performed automatically by the online concierge system 140 without human intervention.

The online concierge system 140, or another online system, receives a selection of a source of items from a user and presents the user with various items maintained by the source. For example, sources for an online concierge system 140 are retailers from which various items may be obtained by a picker for a customer. In response to receiving a selection of a retailer from a user, the online concierge system 140 presents the user with items available from the retailer. As another example, a source for a different online system maintains different content items, and the online system retrieves content items from a source selected by a user for presentation to the user. This allows the online system to provide users with access to items maintained by different sources via the online system.

As further described above in conjunction with FIG. 3, the online system includes a source identification section in one or more interfaces generated and presented to users. The source identification section includes a specific number of slots, with each slot identifying a source of items to the user. In response to receiving a selection of a slot in the source identification section from a user, the online system retrieves at least a set of items associated with a source identified by the selected slot and presents the set of items to the user. Hence, identifying different sources in various slots of the source selection interface allows the online system to simplify retrieval of items associated with different sources. As further described above in conjunction with FIG. 3, the source identification section identifies both sources with which a user performed a specific interaction and new sources, which are sources with which the user has not performed the specific interaction within a threshold time interval before the source identification section was presented to the user.

To allocate slots in the source identification section of an interface (e.g., interface 300 and source identification section 310 in FIG. 3) between new sources and sources with which the user previously performed a specific interaction, the online system identifies 405 a geographic region. For example, the online system identifies 405 a geographic region including a location specified by a user profile of a user. In another example, the online system identifies 405 a geographic region based on an input from the user specifying a geographic region. As another example, the online system identifies 405 a geographic region including a location of a client device from which the user accesses the online system. In other embodiments, the online system identifies 405 a geographic region based on other suitable criteria. Identifying a geographic region allows the online system to account for variations in sources accessible to different geographic regions and to account for variations in interactions with sources by users in different geographic regions.

The online system identifies 410 sources associated with the identified geographic region. For example, the online system identifies 410 retailers having a physical location in the identified geographic region. As another example, the online system identifies 410 sources capable of providing items to the identified geographic region.

To associate different models for selecting a source from a plurality of models with different slots in the interface for source identification sections presented to users within the identified geographic region, the online system generates 415 a set of candidate combinations of different models for selecting sources and slots in the source identification section. Each candidate combination includes associations between a model from the plurality of models and one or more slots and additional associations between an additional model from the plurality of models and one or more alternative slots. Different candidate combinations associate at least one different model of the plurality of models with at least one slot relative to other candidate combinations. For example, referring to FIG. 3, a candidate combination associates an interaction model with slots 315A, slot 315C, and slot 315D and associates a discovery model with slot 315B; however, an alternative candidate combination associates the interaction model with slot 315A and slot 315C and associates the discovery model with slot 315B and slot 315D.

Hence, different combinations differently associate one or more slots in the source identification section with a different model of the plurality relative to other combinations. For example, a candidate combination associates an interaction model with a group of slots in the interface section and associates a discovery model with slots in the interface that are not in the group. Another candidate combination associates the interaction model with a different group of slots in the interface and associates the discovery model with slots in the interface not in the different group of slots. In an example, the source identification section includes seven slots, and a first combination associates the interaction model with a first slot, a second slot, and a fifth slot and associates the discovery model with a third slot, a fourth slot, a sixth slot, and a seventh slot. Similarly, a second combination associates the interaction model with a second slot, a fourth slot, a sixth slot, and a seventh slot and associates the discovery model with a first slot, a third slot, and a fifth slot. By generating 415 different candidate combinations, the online system generates different ways to generate the source identification section by associating different models with different slots in the source identification section.

Different models for selecting sources use different information for when selecting sources, as further described above in conjunction with FIGS. 2 and 3. For example, the interaction model selects a source based on attributes of a source and characteristics of a user, such as prior interaction by the user with sources, while the discovery model selects a new source that the user has not previously interacted with based on an amount of a specific interaction performed by users associated with the geographic region with new sources. Having different models use different information for selectin sources, using different models for selecting sources presented by different slots in a source identification section creates variations in user interaction with different slots based on which model was used to select a source for a slot.

To account for variations in interaction by users in the identified geographic region when different candidate combinations associate different models with different slots in a source identification section, the online system generates 420 multiple candidate source identification sections that each correspond to a different candidate combination of different models for selecting sources and different slots in the candidate source identification section. For example, the online system generates 420 a candidate source identification section for each candidate combination of the set. Alternatively the online system generates 420 a candidate source identification for each of a subset of the candidate combinations. The online system presents 425 different candidate source identification sections to different users in the identified geographic region over time and captures 430 interactions by the users in the identified geographic region with different candidate source identification section. For example, during a training phase, the online system randomly selects a candidate source identification section for a user in the identified geographic region requesting an interface and presents 425 the selected candidate source identification section to the user. The online system stores information identifying the candidate source identification section presented to the user and information describing one or more interactions by the user with one or more slots in the candidate source identification section or one or more specific interactions by the user with one or more sources presented by the candidate source identification section within a threshold amount of time after the candidate source identification section was presented. As another example, the online system stores an indication that the user performed a specific interaction with a source included in the candidate source identification section within a threshold amount of time of being presented with the candidate source identification section. The captured interactions with candidate source identification sections allow the online system to evaluate how users in the identified geographic region interact with different models used to select sources for slots in different candidate source identification sections.

Based on the captured interactions by the users in the geographic region with different candidate source identification sections, the online system generates 435 at least a plurality of metrics for various candidate combinations of models for selecting sources and slots in the source identification section corresponding to the different candidate source identification sections. In various embodiments, the online system generates 435 multiple metrics for each candidate combination. One or more metrics are based on performance of one or more interactions by a user with a source identified by a slot after presentation of a candidate source identification section. For example, a metric is based on a frequency with which users in the identified geographic region perform a specific interaction with sources presented by one or more slots in the candidate source identification section within a threshold amount of time after the candidate source identification section was presented to the users. Other metrics may be based on other interactions performed by users in the identified geographic region with sources presented by the candidate source identification section within the threshold amount of time after presentation of the candidate source identification section. For example, a metric is a percentage of sources presented by the candidate source identification section with which a user performed the specific interaction within the threshold amount of time after the candidate source identification section was presented.

One or more alternative metrics for a candidate source identification section are based on interactions that users in the identified geographic region did not perform with one or more sources before the one or more sources were presented to users in the identified geographic region via a slot in a candidate source identification interface. For example, an alternative metric is a percentage of sources in a candidate source identification section with which a user in the identified geographic region has not performed the specific interaction within a specific time interval before the candidate source identification section was presented to the user.

As used herein, a "relevance metric" refers to a metric for a candidate source identification section based on performance of the specific interaction by a user with a source identified by a candidate source identification section within the threshold amount of time after presentation of the candidate source identification section. Similarly, a "discovery metric" used herein refers to a metric for a candidate source identification section based on an amount of sources presented in the candidate source identification section with which a user has not performed the specific interaction (or another interaction) within the specific time interval before presentation of the candidate source identification section. For example, a relevance metric for a candidate source identification section comprises a percentage of sources in the candidate source identification section that a user in the identified geographic region accessed within a threshold amount of time after being presented with the candidate source identification section. As another example, a discovery metric for the candidate source identification section comprises a percentage of sources in the candidate source identification section that a user in the identified geographic region did not previously access within a specific time interval from a time when the candidate slot identification section was presented.

Based on at least a plurality of metrics generated 435 for candidate combinations of models for selecting sources and slots based on captured interactions by users with corresponding candidate source identification sections, the online system selects 440 a specific combination from the set of combinations for the identified geographic region. In various embodiments, the online system selects a candidate source identification section based on at least one relevance metric and at least one discovery metric and selects 440 the specific combination of models for selecting sources and slots corresponding to the selected candidate source identification section. In various embodiments, the online system selects 440 a specific combination corresponding to a candidate source identification section having a metric with a value equaling or exceeding a threshold and having an alternative metric with a value equaling or exceeding an alternative threshold value. For example, the online system selects 440 a candidate combination corresponding to a candidate source identification section having a discovery metric equaling or exceeding a discovery threshold and having a relevance metric equaling or exceeding a relevance threshold. The discovery threshold and the relevance threshold may have different values in different embodiments. Similarly, the online system may change the discovery threshold or the relevance threshold over time. The online system may associate different thresholds with different metrices. Further, the online system may associate different thresholds for different metrics for different geographic regions in some embodiments. Using different metrics, such as the relevance metric and the discovery metric, to select 440 the specific combination of models for selecting sources and slots in the source identification section for the identified geographic region allows the online system to account for different types of interactions by users in the identified geographic region to optimally allocate different models with slots of the limited number of slots. This allows the online system to account for interactions by users in the geographic regions when allocating slots in the source identification section to sources with which a user previously interacted and new sources. The online system stores the specific combination of models for selecting the source and slots in the source identification section in association with an identifier of the identified geographic region.

Figure 5:
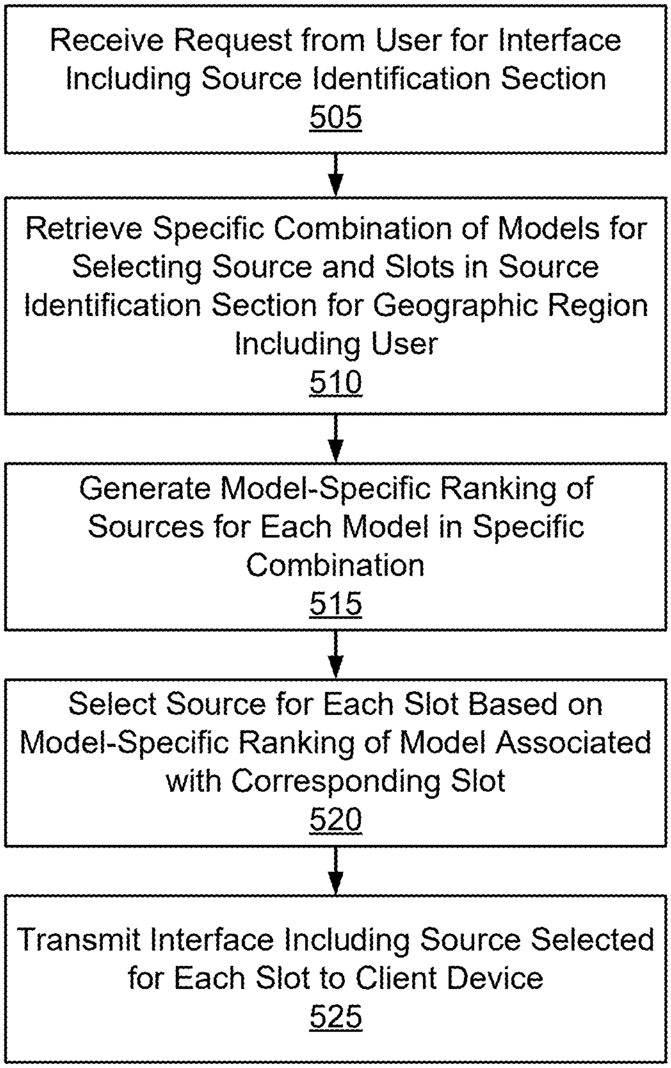
FIG. 5 illustrates a flowchart of a method for generating an interface for a user that includes slots identifying different sources of content for the user, in accordance with one or more embodiments.

Subsequently, the online system leverages the specific combination of models for selecting sources and slots in the source identification section when presenting one or more interfaces to a user in the identified geographic region. FIG. 5 is a flowchart of one embodiment of a method for generating an interface for a user that includes slots identifying different sources of content for the user. Alternative embodiments may include more, fewer, or different steps from those illustrated in FIG. 5, and the steps may be performed in a different order from that illustrated in FIG. 5. These steps may be performed by an online system (e.g., online concierge system 140). Additionally, each of these steps may be performed automatically by the online system without human intervention.

The online system (such as an online concierge system 140) receives 505 a request for an interface including the source identification section from a user having a location in the identified geographic region and retrieves 510 the specific combination of models for selecting sources and slots in the source identification section for the identified geographic region. As further described above in conjunction with FIG. 4, the specific combination specifies a model from a plurality of models used to select one or more sources identified by a set of slots in the source identification section and specifies an additional model from the plurality of models used to select one or more additional sources identified by an additional set of slots in the source identification section. In various embodiments, the specific combination associates at least two different models for selecting sources for different groups of slots, with at least one slot associated with a different model than is associated with the other slots.

The online system applies each model included in the specific combination to attributes of sources associated with the identified geographic region, attributes of the identified geographic region, or characteristics of the user to generate 515 at least a plurality of model-specific rankings of sources for the user. The online system generates 515 a model-specific ranking for each model associated with at least one slot by the specific combination. A model-specific ranking ranks sources based on an output of a corresponding model. Different models leverage different information to generate different types of outputs, so different model-specific rankings may have sources in different orders. For example, the specific combination of models for selecting sources and slots associates the interaction model with a first group of slots and associates the discovery model with a second, different, group of slots. In the preceding example, the online system generates 515 an interaction ranking based on likelihoods of the user performing a specific interaction with sources within a threshold amount of time of the sources being displayed in an interface based on attributes of sources with which the user previously interacted and characteristics of the user via the interaction model. Similarly, the online system generates 515 a discovery ranking based on interaction volumes identifying a number of requests for items from new sources based on attributes of the new sources and attributes of the identified geographic region via the discovery model. Other model-specific rankings may be based on different output generated by other types of models.

Based on each model-specific rankings and the specific combination trained models for selecting sources and slots in the source identification section for the identified geographic region, the online system selects 520 a source for each slot in the source identification section. For a slot, the online system identifies a model associated with the slot by the specific combination and selects a source for the slot based on a model-specific ranking generated from the model associated with the slot. This uses different model-specific rankings for selecting 520 sources for different slots in the source identification section based on associations between different models and slots by the specific combination. For example, the online system uses the interaction ranking to select 520 sources for slots associated with the interaction model by the specific combination and uses the discovery ranking to select 520 sources for alternative slots that the specific combination associates with the discovery model. In some embodiments, when selecting 520 a source for a slot, the online system selects 520 a source having at least a threshold position in a corresponding model-specific ranking. The online system maintains different threshold positions for different model-specific rankings in various embodiments. For example, the online system maintains an interaction threshold position for the interaction ranking and maintains a different discovery threshold position for the discovery ranking. Maintaining threshold positions for model-specific rankings limits a number of sources that the online system evaluates for presentation by one or more slots.

In various embodiments, when selecting 520 a source for a slot from a model-specific ranking based on the model associated with the slot, the online system performs a weighted sampling of sources having at least the threshold position in the model-specific ranking. Selecting through weighted sampling increases a probability of a source with a higher position in the model-specific ranking being selected, while providing sources with lower positions in the model-specific ranking with opportunities to be selected 520 and presented by a slot. Using weighted sampling of corresponding model-specific rankings to select 520 a source for a slot allows the online system to select 520 different sources for presentation via a slot when different requests for the interface including the source identification section are received from the user, identifying a wider range of sources to the user via the source identification section over time.

After selecting 520 a source for each slot in the source identification section based on model-specific rankings of sources corresponding to models associated with various slots by the specific combination, the online system transmits 525 the interface with a source selected 520 for each slot of the source identification section to a client device of the user. The client device displays the interface including the source identification section to the user. As further described above in conjunction with FIG. 3, the source identification section identifies a different source in each slot.

The source identification section allows the user to access items from a source by selecting a slot in the source identification section identifying the source. Associating different models with different slots based on the specific combination allows the source identification section to identify a mix of both new sources and sources with which the user previously interacted in different slots. Further, using model-specific rankings for selecting sources identified by different slots accounts for different models associated with different slots by the specific combination and leverages information about the user, about sources, and about the identified geographic region to tailor sources selected 525 for identification. This increases a likely relevance of sources displayed by the source identification section to the user, which increases a likelihood of the user interacting with the source identification section.

Figure 6:
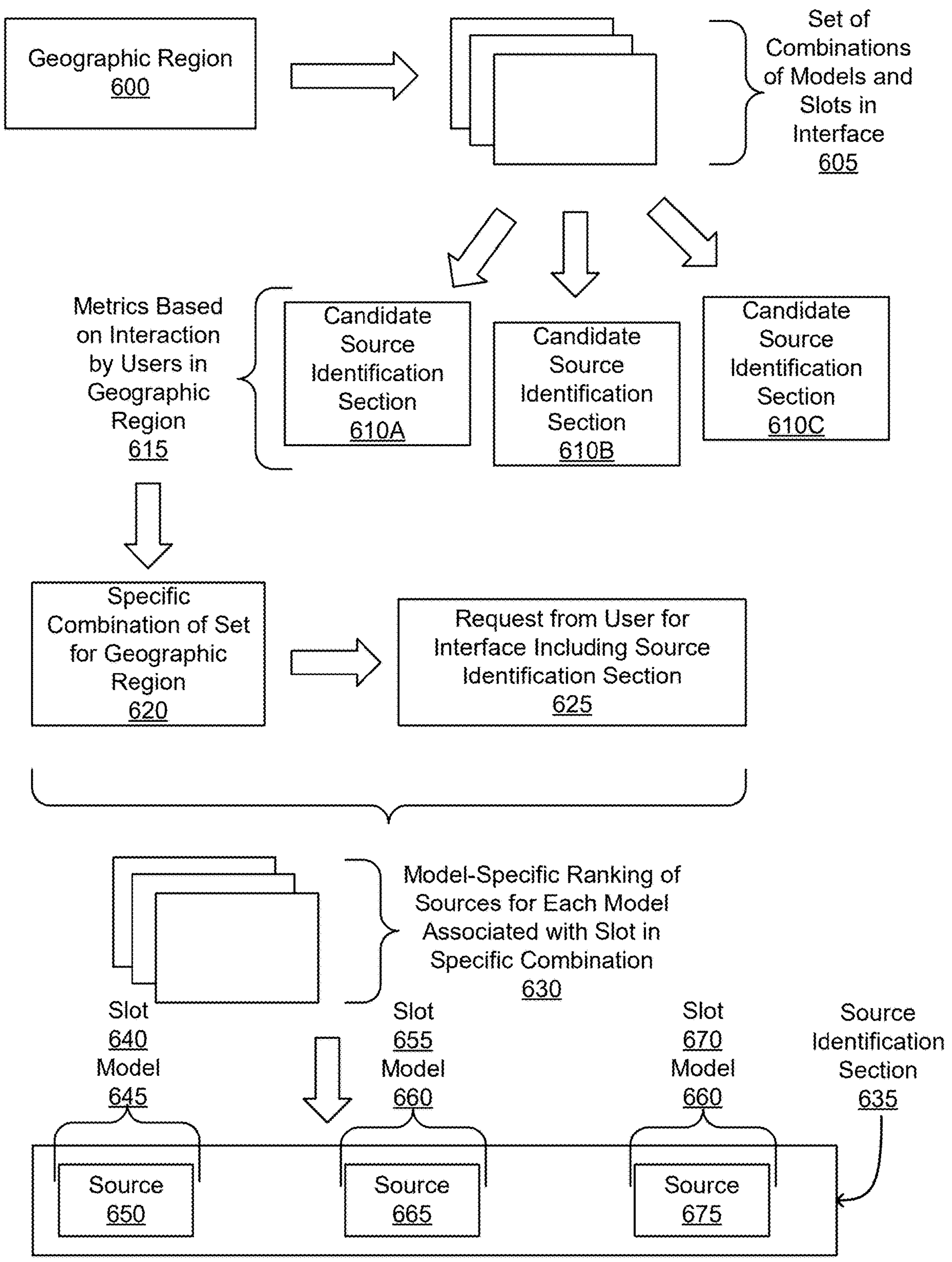
FIG. 6 illustrates a process flow diagram of a method for an online system selecting sources of content for presentation in different slots of an interface and generating the interface identifying different sources, in accordance with one or more embodiments.

FIG. 6 is a process flow diagram of a method for an online system selecting sources of content for presentation in different slots of an interface and generating the interface identifying different sources. As further described above, an online system obtains items from different sources for presentation or access by various users. For example, the online system is an online concierge system 140 with different sources comprising different retailers. A user of the online concierge system 140 selects a retailer and identifies one or more items for a picker to obtain from the retailer. As another example, the online system is a content presentation system obtaining items comprising content for presentation to users from a source in response to receiving a selection of the source from a user.

To simplify selection of a source by users, one or more interfaces generated by the online system and presented to a user include a source identification section having a specific number of slots. Each slot identifies a source to the user. For example, each slot includes information identifying a different source (e.g., a name of a source, an image of a source, etc.). In response to receiving a selection of a slot, the online system retrieves at least a set of items associated with the source identified by the selected slot for presentation to the user, simplifying access to items offered by sources through user selection of a slot in the source identification section.

As the online system obtains items from multiple sources, the user may be unaware of potentially relevant sources from which the online system obtains items that have items potentially relevant to the user. To increase the user's awareness of different sources for items, the online system identifies one or more new sources using one or more slots of the source identification section. A "new source" is a source from which the user has not previously obtained items or from which the user has not obtained items during a specific time interval before presentation of the source identification section. For example, a new source is a retailer from which the user has not placed an order within a specific time interval before presentation of the source identification section to the user. However, to encourage interaction by the user, other slots in the source identification system identify sources with which the user has previously obtained one or more items during the specific time interval or with which the user has performed a specific interaction during the specific time interval.

As the source identification section includes a specific and limited number of slots, to balance between likelihood of user interaction with the source identification section and identification of new sources of items to the user, the online system uses certain slots in the source identification section to identify new sources and other slots in the source identification section to identify sources with which the user previously interacted. To optimize allocation of the specific number of slots in the source identification section between new sources and sources with which the user previously interacted, the online system accounts for variations in user interaction patterns in different geographic regions and sources accessible in different geographic regions by identifying a geographic region 600 that includes multiple locations. The online system may individually identify different geographic regions 600 in some embodiments, or may identify a geographic region satisfying one or more criteria in various embodiments, as further described above in conjunction with FIG. 4.

For the identified geographic region 600, the online system identifies sources associated with the identified geographic region 600. For example, the online system identifies sources offering offers items accessible to users of the online system within the identified geographic area 600. As an example, each source is a retailer offering items to be obtained for a user, so the online system identifies retailers having at least one physical location within the identified geographic region 600 or having at least one physical location within a threshold distance of the identified geographic region 600. In another example, each identified source offers items comprising content for presentation to users that are accessible to users within the identified geographic region 600.

As further described above in conjunction with FIGS. 3-5, the online system uses different models to select sources for presentation in various slots of the source identification section of an interface. In various embodiments, the online system uses at least two models for selecting sources presented in different slots. Different models are used to select sources for presentation in different slots. For example, an interaction model outputs a probability of a user accessing one or more items available from a source and the online system selects one or more sources with which the user previously interacted based on their corresponding probabilities. Using the interaction model allows inclusion of sources with which a user previously interacted in the source identification section, which increases a likelihood of the user selecting a source via the source identification section.

To select one or more new sources for identification via one or more slots, the online system applies a discovery model to attributes of sources and attributes of the identified geographic area 600 to various sources with which the user has not previously interacted (or with which the user has not interacted in at least a threshold time interval). The discovery model generates an interaction volume for a new source (e.g., a number of interactions from users in the identified geographic region 600 where users in the identified geographic region 600 obtained items from the new source, or performed a specific interaction with the new source, during a specific time interval) in various embodiments. The online system selects one or more new sources for presentation in one or more corresponding slots based on their corresponding interaction volumes. While presenting new sources in slots of the source identification section identifies additional sources of items to the user, the user's unfamiliarity with the new sources may decrease a likelihood of the user selecting a source via the source identification section.

To balance a number of slots of the source identification section used to present new sources and a different number of slots of the source identification section used to present sources with which the user previously interacted, the online system generates a set 605 of candidate combinations for the identified geographic region 600. A candidate combination associates a model from at least a plurality of models with each slot of the source identification section, where a model is associated with one or more slots and at least one additional model is associated with alternative slots. Hence, at least one slot in a candidate combination is associated with a different model than other slots in the candidate combination. Further, different candidate combinations associate the model or the additional model with a different slot than other candidate combinations, so the set of candidate combinations includes different associations of models of a plurality of models with different slots in the source identification section.

While the set 605 of candidate combinations identifies different permutations of models for selecting sources identified by different slots, source identification sections presenting sources based on different candidate combinations elicit different amounts of interaction from users. To account for variations in user interaction with different allocations of sources to slots, the online system generates candidate source identification sections 610A-610C (also referred to individually and collectively using reference number 610) for each of the set 605 of candidate combinations. In some embodiments, the online system generates candidate source identification sections for a subset of the candidate combinations. In the example of FIG. 6, candidate source identification section 610A includes associations between an interaction model and a first group of slots and between a discovery model and slots not in the first group. Similarly, candidate source identification section 610B includes associations between the interaction model and a third group of slots and between the discovery model and a fourth group of slots. Candidate source identification section 610C includes associations between the interaction model and a fifth group of slots, as well as associations between the discovery model and a sixth group of slots. Hence, different candidate source identification sections 610 correspond to using different models for selecting sources identified by different slots.

Over time, the online system presents different candidate source identification sections 610 to users associated with the identified geographic region 600. For example, the online system randomly selects a candidate source identification section 610 for presentation to a user associated with the identified geographic region 600 in response to receiving a request for an interface including a source identification section from the user associated with the identified geographic region 600. Randomly selecting a candidate source identification section 610 for a user presents different candidate source identification sections 610 to users associated with the identified geographic area 600 over time. The online system captures interactions by users associated with the identified geographic region 600 over time, storing descriptive information identifying interactions by a user with a candidate source identification section 610 and an identifier of the candidate source identification section 610 presented to the user. For example, the online system stores an indication that a user performed a specific interaction with a source included in the candidate source identification section within a threshold amount of time of being presented with the candidate source identification section.

Based on captured interactions by users associated with the identified geographic region 600 with various candidate source identification sections 610, the online system generates at least a plurality of metrics 615 for each combination of models for selecting sources and slots corresponding to a candidate source identification section 610. Generating multiple metrics 615 based on interactions with a candidate source identification section 610 allows the online system to evaluate effectiveness of different candidate source identification sections 610 in causing different types of interactions by users. Metrics 615 generated for a combination of models for selecting sources and slots are based on captured interactions by users associated with the identified geographic region 600 with a candidate source identification section 610 corresponding the combination of models for selecting sources and slots.

As further described above in conjunction with FIG. 3, the online system generates a metric and an alternative metric for each candidate combination of the set corresponding to a candidate source identification section 610 presented to users associated with the geographic region 600. For example, the metric for a combination is based on a percentage of sources presented by a candidate source identification section 610 corresponding to the combination with which users in the identified geographic region 600 performed a specific interaction within a threshold amount of time after the candidate source identification section 610 was presented to users via an interface. Hence, the metric provides an indication of user interaction with sources presented in the candidate source identification section. In various embodiments, the alternative metric for a combination is based on a percentage of sources presented by a corresponding candidate source identification section 610 with which the user had not performed the specific interaction (or had not performed an alternative interaction) during a specific time interval before the candidate source identification section 610 was presented. Hence, the alternative metric provides a measure of efficacy of the candidate combination in presenting new sources of items to the user via a corresponding candidate source identification section 610.

Based on at least a plurality of the metrics 615, the online system selects a specific combination 620 of models for selecting sources and slots for the identified geographic region 600. As further described above in conjunction with FIG. 3, the specific combination 620 of models for selecting sources and slots is a candidate combination corresponding to a candidate source identification section 610 having at least a threshold value for the metric and at least an additional threshold value for the alternative metric. In other embodiments, the specific combination 620 of models for selecting sources and slots is a candidate combination corresponding to a candidate source identification section 610 where the metric satisfies one or more criteria, and the alternative metric satisfies one or more alternative criteria. The online system stores an association between the specific combination 620 of models for selecting sources and slots and the identified geographic region 600.

Subsequently, the online system receives a request 625 for an interface including the source identification section from a user associated with the identified geographic region 600. For example, the online system receives a request 625 from a client device of a user associated with a location within the identified geographic region 600 for an interface having the source identification section. As another example, the online system receives a request 625 from a client device of a user having a location within the identified geographic region 600 included in a user profile for the user. The online system retrieves the specific combination 620 of models for selecting sources and slots associated with the identified geographic region 600 and generates a model-specific ranking 630 of sources associated with the identified geographic region 600 for each model included in the specific combination 620 of models for selecting sources and slots. For example, the specific combination 620 of models for selecting sources and slots associated with the identified geographic region 600 includes an interaction model associated with one or more slots and a discovery model associated with one or more alternative slots. In the preceding example, the online system generates an interaction-specific ranking of sources associated with the identified geographic region 600 using the interaction model and generates a discovery-specific ranking of sources associated with the identified geographic region 600 using the discovery model. The online system generates a model-specific ranking 630 of sources corresponding to each model associated with at least one slot by the specific combination 620 of models for selecting sources and slots associated with the geographic region.

Based on the model-specific rankings 630, the online system generates the source identification section 635 for the user in response to the request 625. The source identification section 635 includes a specific number of slots, with each slot presenting information identifying a source selected for a slot based on a model-specific ranking 630 of sources corresponding to the model associated with the slot by the specific combination 620 of models for selecting sources and slots. In the example of FIG. 6, source identification section 635 includes three slots—slot 640, slot 655, and slot 670. For purposes of illustration, FIG. 6 shows an example where the specific combination 620 of models for selecting sources and slots associates model 645 with slot 640, associates model 660 with slot 655, and associates model 660 with slot 670. Hence, slot 640 presents information identifying source 650, which was selected based on a model-specific ranking 630 based on output of model 645. However, slot 655 presents information identifying source 665 and slot 670 presents information identifying source 675, with source 665 and source 675 selected based on a model-specific ranking 630 based on output of model 660. The online system transmits the requested interface including the source identification section 635 to the client device of the user for presentation.

As the specific combination 620 of models for selecting sources and slots associated with the identified geographic region 600 identifies different models of a plurality of models with various slots of the source identification section 635, the specific combination associated with the identified geographic region 600 affects information is used to select sources displayed in different slots of the source identification section 635 generated for the user associated with the identified geographic region 600. This allows the online system to optimally allocate the limited specific number of slots in the source identification section 635 between sources with which the user previously interacted and new sources to optimize both short-term interaction with sources via the source identification section 635 and interactions with a greater diversity of sources by the user over time based on previously captured interactions by users associated with the identified geographic region 600.

Additional Considerations

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a non-transitory computer readable medium, comprising:

identifying a geographic region;

identifying sources of items that are associated with the geographic region;

for one or more iterations:

generating a set of candidate combinations of models comprising a first set of models and a second set of models, wherein each model of the first set of models or the second set of models generates one or more sources, each source corresponding to a slot in a source identification section having a specific number of slots, each candidate combination including a model from the first set of models associated with one or more slots and an additional model from the second set of models associated with one or more alternative slots, wherein different candidate combinations associated with the first set of models or the second set of models are associated with at least one different slot than other candidate combinations of the set;

generating a candidate source identification section for each candidate combination of the set, each slot of a candidate source identification section displaying information identifying a source associated with the geographic region selected based on a model associated with the slot by a corresponding candidate combination;

presenting interfaces including different candidate source identification sections to users associated with the geographic region;

generating a plurality of metrics for each candidate combination of the set based on interactions with the presented interfaces including candidate source identification sections corresponding to each candidate combination of the set by the users associated with the geographic region;

selecting a specific combination of the set of candidate combinations based on the plurality of metrics, the specific combination associating a first model of the set of candidate combinations of models with one or more slots of the source identification section and associating a second model of the set of candidate combinations of models with one or more remaining slots of the source identification section; and storing an association between the specific combination of the set and the geographic region;

receiving, at the computer system, from a user, a request for an interface including the source identification section associated with the geographic region;

retrieving the specific combination of the set associated with the geographic region;

accessing a user profile associated with the user, wherein the user profile includes characteristics of the user comprising prior interactions by the user with the sources of items associated with the geographic region;

generating a plurality of model-specific rankings for the sources associated with the geographic region based on the prior interactions by the user with the sources of items associated with the geographic region, each model-specific ranking corresponding to a different model associated with a slot by the specific combination of the set;

generating the source identification section by selecting a source associated with the geographic region for each slot based on a model-specific ranking corresponding to a model associated with the slot by the specific combination of the set; and transmitting the interface including the generated source identification section to a client device of the user for presentation.

2. The method of claim 1, wherein selecting a specific combination of the set of candidate combinations comprises selecting, for the first model, an interaction model generating a probability of a user performing a specific interaction with a source based on attributes of the source and characteristics of the user.

3. The method of claim 2, wherein selecting a specific combination of the set of candidate combinations comprises selecting, for the second model, a discovery model generating an interaction volume for the source based on attributes of the geographic region, the interaction volume comprising a number of a specific interaction from users in the geographic region during a specific time interval.

4. The method of claim 3, wherein the computer system applies the interaction model to sources associated with the geographic region with which a user previously performed a specific interaction.

5. The method of claim 3, wherein the computer system applies the discovery model to sources associated with the geographic region with which a user did not perform a specific interaction during a specific time interval.

6. The method of claim 1, wherein selecting the specific combination of the set of candidate combinations based on the plurality of metrics comprises:

selecting a candidate combination having a value of a metric equaling or exceeding a threshold value and having a value of an alternative metric equaling or exceeding an alternative threshold value.

7. The method of claim 6, wherein the metric is based on a percentage of sources presented by a corresponding candidate source identification with which users in the geographic region performed a specific interaction within a threshold amount of time after presentation of the corresponding candidate source identification section.

8. The method of claim 7, wherein the alternative metric is based on a percentage of sources presented by the corresponding candidate source identification with which users in the geographic region had not performed the specific interaction within a specific time interval before presentation of the corresponding candidate source identification section.

9. The method of claim 1, wherein selecting the source associated with the geographic region for each slot based on the model-specific ranking corresponding to the model associated with the slot by the specific combination of the set comprises:

selecting a source associated with a geographic region for the slot through a weighted sampling of the model-specific ranking corresponding to the model associated with the slot by the specific combination of the set.

10. A computer program product comprising a non-transitory computer readable storage medium having instructions encoded thereon that, when executed by a processor, cause the processor to perform steps comprising:

identifying a geographic region;

identifying sources of items that are associated with the geographic region;

for one or more iterations:

generating a set of candidate combinations of models comprising a first set of models and a second set of models, wherein each model of the first set of models or the second set of models generates one or more sources, each source corresponding to a slot in a source identification section having a specific number of slots, each candidate combination including a model from the first set of models associated with one or more slots and an additional model from the second set of models associated with one or more alternative slots, wherein different candidate combinations associated with the first set of models or the second set of models are associated with at least one different slot than other candidate combinations of the set;

generating a candidate source identification section for each candidate combination of the set, each slot of a candidate source identification section displaying information identifying a source associated with the geographic region selected based on a model associated with the slot by a corresponding candidate combination;

presenting interfaces including different candidate source identification sections to users associated with the geographic region;

generating a plurality of metrics for each candidate combination of the set based on interactions with the presented interfaces including candidate source identification sections corresponding to each candidate combination of the set by the users associated with the geographic region;

selecting a specific combination of the set of candidate combinations based on the plurality of metrics, the specific combination associating a first model of the set of candidate combinations of models with one or more slots of the source identification section and associating a second model of the set of candidate combinations of models with one or more remaining slots of the source identification section; and storing an association between the specific combination of the set and the geographic region;

receiving, from a user, a request for an interface including the source identification section associated with the geographic region;

retrieving the specific combination of the set associated with the geographic region;

accessing a user profile associated with the user, wherein the user profile includes characteristics of the user comprising prior interactions by the user with the sources of items associated with the geographic region;

generating a plurality of model-specific rankings for the sources associated with the geographic region based on the prior interactions by the user with the sources of items associated with the geographic region, each model-specific ranking corresponding to a different model associated with a slot by the specific combination of the set;

generating the source identification section by selecting a source associated with the geographic region for each slot based on a model-specific ranking corresponding to a model associated with the slot by the specific combination of the set; and transmitting the interface including the generated source identification section to a client device of the user for presentation.

11. The computer program product of claim 10, wherein selecting a specific combination of the set of candidate combinations comprises selecting, for the first model, an interaction model generating a probability of a user performing a specific interaction with a source based on attributes of the source and characteristics of the user.

12. The computer program product of claim 11, wherein selecting a specific combination of the set of candidate combinations comprises selecting, for the second model, a discovery model generating an interaction volume for the source based on attributes of the geographic region, the interaction volume comprising a number of a specific interaction from users in the geographic region during a specific time interval.

13. The computer program product of claim 10, wherein selecting the specific combination of the set of candidate combinations based on the plurality of metrics comprises:

selecting a candidate combination having a value of a metric equaling or exceeding a threshold value and having a value of an alternative metric equaling or exceeding an alternative threshold value.

14. The computer program product of claim 13, wherein the metric is based on a percentage of sources presented by a corresponding candidate source identification with which users in the geographic region performed a specific interaction within a threshold amount of time after presentation of the corresponding candidate source identification section.

15. The computer program product of claim 14, wherein the alternative metric is based on a percentage of sources presented by the corresponding candidate source identification with which users in the geographic region had not performed the specific interaction within a specific time interval before presentation of the corresponding candidate source identification section.

16. The computer program product of claim 10, wherein selecting the source associated with the geographic region for each slot based on the model-specific ranking corresponding to the model associated with the slot by the specific combination of the set comprises:

selecting a source associated with a geographic region for the slot through a weighted sampling of the model-specific ranking corresponding to the model associated with the slot by the specific combination of the set.

17. A system comprising:

a processor; and a non-transitory computer readable storage medium having instructions encoded thereon that, when executed by the processor, cause the processor to perform steps comprising:

identifying a geographic region;

identifying sources of items that are associated with the geographic region;

for one or more iterations:

generating a set of candidate combinations of models comprising a first set of models and a second set of models, wherein each model of the first set of models or the second set of models generates one or more sources, each source corresponding to a slot in a source identification section having a specific number of slots, each candidate combination including a model from the first set of models associated with one or more slots and an additional model from the second set of models associated with one or more alternative slots, wherein different candidate combinations associated with the first set of models or the second set of models are associated with at least one different slot than other candidate combinations of the set;

generating a candidate source identification section for each candidate combination of the set, each slot of a candidate source identification section displaying information identifying a source associated with the geographic region selected based on a model associated with the slot by a corresponding candidate combination;

presenting interfaces including different candidate source identification sections to users associated with the geographic region;

generating a plurality of metrics for each candidate combination of the set based on interactions with the presented interfaces including candidate source identification sections corresponding to each candidate combination of the set by the users associated with the geographic region;

selecting a specific combination of the set of candidate combinations based on the plurality of metrics, the specific combination associating a first model of the set of candidate combinations of models with one or more slots of the source identification section and associating a second model of the set of candidate combinations of models with one or more remaining slots of the source identification section; and storing an association between the specific combination of the set and the geographic region;

receiving, at the computer system, from a user, a request for an interface including the source identification section associated with the geographic region;

retrieving the specific combination of the set associated with the geographic region;

accessing a user profile associated with the user, wherein the user profile includes characteristics of the user comprising prior interactions by the user with the sources of items associated with the geographic region;

generating a plurality of model-specific rankings for the sources associated with the geographic region based on the prior interactions by the user with the sources of items associated with the geographic region, each model-specific ranking corresponding to a different model associated with a slot by the specific combination of the set;

generating the source identification section by selecting a source associated with the geographic region for each slot based on a model-specific ranking corresponding to a model associated with the slot by the specific combination of the set; and transmitting the interface including the generated source identification section to a client device of the user for presentation.

* * * * *